United States Patent
Robinson et al.

(10) Patent No.: US 7,029,817 B2
(45) Date of Patent: Apr. 18, 2006

(54) TONER PROCESSES

(75) Inventors: Sarah J. P. Robinson, Mississauga (CA); Thomas E. Enright, Tottenham (CA); Alan E. J. Toth, Burlington (CA); Milan Maric, Hamilton (CA); Michael S. Hawkins, Cambridge (CA); Marko D. Saban, Etobicoke (CA); Guerino G. Sacripante, Oakville (CA); George Liebermann, Mississauga (CA)

(73) Assignee: Xerox Corporation, Stamford, CT (US)

( * ) Notice: Subject to any disclaimer, the term of this patent is extended or adjusted under 35 U.S.C. 154(b) by 167 days.

(21) Appl. No.: 10/778,557

(22) Filed: Feb. 13, 2004

(65) Prior Publication Data

US 2005/0181296 A1  Aug. 18, 2005

(51) Int. Cl.
*G03G 9/087* (2006.01)

(52) U.S. Cl. .............................. 430/137.14; 430/109.4
(58) Field of Classification Search ........... 430/137.14, 430/109.4
See application file for complete search history.

(56) References Cited

U.S. PATENT DOCUMENTS

| | | | |
|---|---|---|---|
| 3,674,736 A | 7/1972 | Lerman et al. | 260/41 R |
| 4,137,188 A | 1/1979 | Uetake et al. | 252/62.1 P |
| 4,983,488 A | 1/1991 | Tan et al. | 430/137 |
| 4,996,127 A | 2/1991 | Hasegawa et al. | 430/109 |
| 5,066,560 A | 11/1991 | Tan et al. | 430/137 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,348,832 A | 9/1994 | Sacripante et al. | 430/109 |
| 5,370,963 A | 12/1994 | Patel et al. | 430/137 |
| 5,604,076 A | 2/1997 | Patel et al. | 430/137 |
| 5,658,704 A | 8/1997 | Patel et al. | 430/137 |
| 5,853,944 A * | 12/1998 | Foucher et al. | 430/137.14 |
| 5,858,601 A | 1/1999 | Ong et al. | 435/137 |
| 5,925,488 A | 7/1999 | Patel et al. | 430/137 |
| 5,977,210 A | 11/1999 | Patel et al. | 523/161 |
| 6,395,445 B1 * | 5/2002 | Toth et al. | 430/137.14 |

* cited by examiner

*Primary Examiner*—Mark A. Chapman
(74) *Attorney, Agent, or Firm*—E. O. Palazzo

(57) ABSTRACT

A toner process comprising the aggregation and coalescence of a sulfonated polyester and a colorant, and wherein said polyester possesses a degree of sulfonation or a sulfonation percentage of from about 0.5 to about 3 mol percent.

29 Claims, No Drawings

TONER PROCESSES

BACKGROUND

The present invention is generally directed to toner processes, and more specifically, to the aggregation and coalescence of an aqueous suspension of colorant, such as pigment particles, wax particles and resin particles, utilizing a coagulant to afford toner composites of various suitable sizes, such as for example, from about 3 to about 11 microns. More specifically, the present invention in embodiments is directed to the preparation of submicron emulsion particles containing a polyester resin with a low percentage of sulfonation, and toner compositions thereof to, for example, permit in embodiments improved toner charge control by reducing RH sensitivity. This is accomplished by reducing the amount of sulfonation selected in the resin used to form a stable emulsion thereof without the use of surfactants.

In embodiments, the present invention involves the preparation of stable emulsions where stable refers, for example, to submicron resin particles that remain suspended in solution for a period of time, at least a number of days or months, and preferably substantially indefinitely. The stable emulsions are prepared, for example, by the dissolution of a resin, and more specifically a polyester, into a solvent, such as acetone, which resulting mixture is then added to hot water and the solvent subsequently removed through a known flashing (distillation) method. Also, the present invention in embodiments relates to the direct preparation of toners and toner resins comprising an initial composition of sulfonated polyester particles, and wherein the polyester possesses a low sulfonated percentage, such as less than or equal to about 3 percent, and more specifically from 1 to about 3 percent without the utilization of the known pulverization and/or classification methods, and wherein in embodiments toner compositions with an average volume diameter of from about 1 to about 25 microns, and more specifically from about 1 to about 10 microns, and a narrow GSD of, for example, from about 1.16 to about 1.26 or about 1.18 to about 1.28 as measured on the Coulter Counter can be obtained. The process of the present invention in embodiments enables the utilization of polymers obtained by polycondensation reactions, such as polyesters, and more specifically, the sulfonated polyesters as illustrated in U.S. Pat. Nos. 5,348,832; 5,658,704 and 5,604,076, the disclosures of which are totally incorporated herein by reference, and which polyesters are generated in a manner to enable a low percentage of sulfonated groups. The resulting toners can be selected for known electrophotographic imaging methods, printing processes, including color processes, digital methods, and lithography.

REFERENCES

There is illustrated in U.S. Pat. No. 4,996,127 a toner of associated particles comprising primarily particles of a polymer with acidic or basic polar groups, and which toners can be prepared by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 are obtained. Other prior art may include U.S. Pat. Nos. 3,674,736; 4,137,188 and 5,066,560.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698; 5,925,488; 5,977,210 and 5,858,601.

The appropriate processes and components of these patents may be selected for the present invention in embodiments thereof.

SUMMARY

Examples of features illustrated herein include:

A feature of the present invention relates to the generation of sulfonated polyesters, emulsions and toners thereof.

It is another feature of the present invention to provide dry toner compositions comprised of a sulfonated polyester resin wherein the sulfonated percentages are low, for example from about 0.5 to about 3 mol percent, where mol percent refers, for example, to the percentage of moles of sulfonated monomer present in the final resin and can be calculated as (moles DMSIP charged/(total moles charged less excess moles glycol)×100 percent).

In another feature of the present invention there are provided simple and economical chemical processes for the preparation of black and colored toner compositions with, for example, excellent colorant, such as pigment dispersion and narrow GSD.

In a further feature of the present invention there is provided a process for the preparation of toner compositions with an average particle volume diameter of from about 1 to about 20 microns, more specifically from about 1 to about 9 microns, and yet more specifically from about 4 to about 7 microns, and with a narrow GSD of from about 1.12 to about 1.30, and more specifically from about 1.14 to about 1.25, each as measured with a Coulter Counter, and wherein the sulfonated polyester contained in the toner is emulsified by a solvent flashing method, thereby providing from about 0.5 to about 3 mol percent of sulfonated groups and wherein the relative humidity sensitivity of the toner containing the polyester generated is excellent and improved as compared to toners with sulfonated polyesters containing, for example, about 4 mol percent sulfonation.

In another feature of the present invention there is provided a composite toner comprised of a sulfonated polymeric resin with colorant, such as pigment and optional charge control agent in high yields of from about 90 percent to about 100 percent by weight of toner without resorting to classification.

In yet another feature of the present invention there are provided toner compositions with low fusing temperatures of from about 110° C. to about 150° C., and with excellent blocking characteristics at from about 50° C. to about 60° C.

Aspects of the present invention relate to a toner process comprising the aggregation and coalescence of a sulfonated polyester and a colorant, and wherein the polyester pos sesses a degree of sulfonation or a sulfonation percentage of from about 0.5 to about 3 mol percent; a process for the preparation of toner which comprises the heating of a sulfonated polyester and a colorant, and wherein the polyester possesses a sulfonation percentage of from about 0.5 to about 3 mol percent, and wherein the heating is accomplished by heating in sequence the polyester and colorant at a first temperature about below the glass transition temperature of the polyester, followed by second subsequent second heating at about above the glass transition of the polyester, and wherein aggregation/coalescence of the polyester and the colorant results, and which process is accomplished by solvent flashing; a toner process comprising heating and solvent flashing a sulfonated polyester, colorant, and optional wax, and wherein the polyester possesses a sulfonation percentage of from about 0.5 to about 3 mol percent, and wherein the heating is accomplished by heating in sequence the polyester and colorant at a first temperature about below the glass transition temperature of the polyester, followed by second subsequent second heating at about above the glass transition of the polyester, and wherein aggregation/coalescence of the polyester and the colorant results; a process comprising i) dispersing a sulfonated polyester resin in water, which water is at a temperature of from about 40° C. to about 90° C., or more specifically, from about 5° C. to about 15° C. above the polyester glass transition temperature, and which dispersing is accomplished in the absence of a surfactant or homogenization to generate stable particles in water, thereby enabling the formation of a submicron sized emulsion;

ii) aggregation of the dispersed sulfonated polyester;

iii) adding a colorant like a pigment dispersion, available from Sun Chemical, as an about 20 to about 50 weight of predispersed pigment in water with a mean pigment size of about 50 to about 150 nanometers, which dispersion is further diluted with, for example, about 150 to about 200 millimeters of DI (deionized) water, and wherein the aggregation rate can be controlled, for example, by the dropwise addition of an alkali halide, such as a dicationic salt, of from about 1 to about 150 milliliters, and more specifically, 1 percent by weight in water, and with heating is, for example, about 40° C. to about 60° C., and more specifically, about 48° C. to about 52° C., until optimum toner sized aggregates are obtained as monitored by both optical microscopy and Coulter Counter particle size measurements;

iv) optionally, but preferably recovering the toner, or toner particles by known methods, such as filtration, washing; and v) drying the toner particles with, for example, a vacuum;

vi) adding to the dry toner particles, or toner of resin and colorant, known toner additives, such as wax, charge additives, surface flow additives, and the like; a toner process wherein there can be selected various pigments, dyes, mixtures thereof, and the like, such as cyan, black, magenta, and yellow pigmented dispersions or mixtures thereof obtained, for example, as a predispersed form with, for example, from about 20 to about 60 weight percent of solids; a process wherein the colorant is a cyan, black, magenta, yellow dispersion or mixtures thereof with from about 10 to about 40 weight percent solids of colorant; a process wherein the sulfonated polyester is of the formula

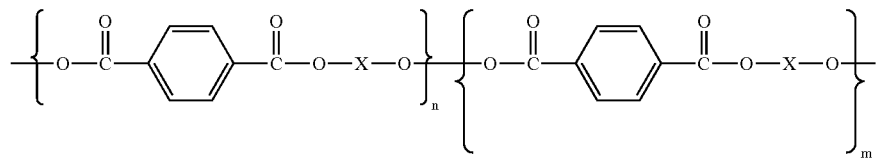

wherein Y is an alkali metal, X is a glycol, and n and m represent the number of segments; a process wherein each of n and m represent a number of from about 3,000 to about 7,000, or from about 4,000 to about 6,000; a process wherein the Y alkali is sodium, lithium, potassium, rubidium, cesium, hydrogen or mixtures thereof; a process wherein the glycol is neopentyl glycol, ethylene glycol, propylene glycol, butylene glycol, propanediol, ethylene glycol, or mixtures thereof; a process wherein the sulfonated polyester is a dispersion comprised of from about 5 to about 30 weight percent solids, and the colorant dispersion contains from about 20 to about 50 weight percent of colorant; a process wherein the sulfonated polyester has a degree of sulfonation of from about 1.5 to about 2.8 mol percent; a process wherein the sulfonated polyester has a degree of sulfonation of from about 0.5 to about 2 mol percent; a process wherein there is obtained a colored toner with a narrow GSD in the range of from about 1.18 to about 1.28; a process wherein the toner particle size is from about 4 to about 7 microns in volume average diameter; a process wherein the toner is isolated, filtered, washed with water, and dried; a process wherein there is added to the surface of the formed toner of sulfonated polyester and colorant, metal salts, metal salts of fatty acids, silicas, metal oxides, or mixtures thereof, each in an amount of from about 1 to about 3 weight percent of the obtained toner; a process wherein the particle size of the dispersed sulfonated polyester is from about 5 to about 200 nanometers; a process wherein the polyester is a random sulfonated copolyester comprised of, on a mol percent basis of the polymer repeat unit, approximately 0.47 of terephthalate, 0.03 of sodium sulfoisophthalate, 0.475 of 1,2 propanediol, 0.025 of diethylene glycol, and which polyester possesses an $M_w$ of about 3,790, an $M_n$ of about 2,560, and a Tg of about 54.6° C.; a toner process comprising heating a mixture of the sulfonated polyester and colorant below or about equal to the glass transition temperature (Tg) of the latex resin; heating the resulting mixture of above about the Tg of the latex resin until the fusion or coalescence of polyester resin and colorant is initiated resulting in toner particles comprised of the sulfonated polyester and colorant; a process wherein the aggregation temperature is from about 40° C. to about 50° C., and the coalescence temperature is from about 50° C., providing this temperature is higher than the aggregation temperature, to about 70° C.; a process wherein the temperature at which the aggregation is accomplished controls the size of the aggregates, and wherein the final toner size is from about 2 to about 20 microns in volume average diameter; a process wherein the colorant is a pigment, and wherein the pigment is in the form of a dispersion, which dispersion contains an ionic surfactant; a toner containing a polyester generated as illustrated herein, and which polyester is, for example, as illustrated, for example, in U.S. Pat. Nos. 5,348,832; 5,853,944; 5,840,462; 5,660,965; 5,658,704; 5,648,193; and 5,593,807; the disclosures of each patent being totally incorporated herein by reference; a process wherein the polyester is preferably a polyester of poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate phthalate), copoly(1,2-propylene-diethylene sodio 5-sulfoisophthalate)-copoly-(1,2-propylene-diethylene-terephthalatephthalate), copoly(ethylene-neopentylene-sodio 5-sulfoisophthalate)-copoly-(ethylene-neopentylene-terephthalate-phthalate), or copoly(propoxylated bisphenol A)-copoly-(propoxylated bisphenol A-sodio 5-sulfoisophthalate; a toner process wherein the polyester is the beryllium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), the magnesium salt of copoly(1,2-dipropylene-5-sulfoisophthalate)-copoly(1,2-propylene terephthalate), the magnesium salt of copoly(1,3-butylene-5-sulfoisophthalate)-copoly(1,3-butylene terephthalate), the calcium salt of copoly(1,2-dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulfo isophthalate)-copoly(1,2-propylene-diethylene terephthalate), the nickel salt of copoly(1,2-dipropylene-5-sulfoisophthalate)-copoly(1,2-propylene terephthalate), the iron salt of copoly(1,3-butylene-5-sulfoisophthalate)-copoly(1,3-butylene terephthalate), the zirconium salt of copoly(1,2-dipropylene-5-sulfoisophthalate)-copoly(1,2-propylene terephthalate), the chromium salt of copoly(1,3-butylene-5-sulfoisophthalate)-copoly(1,3-butylene terephthalate), and the like.

The sulfonated polyester emulsion is generated by a solvent flashing method by, for example, dissolving the polyester in a water miscible solvent, such as acetone, toluene, tetrahydrofuran, or the like, mixing with hot water, wherein hot is for example, from about 70° C. to about 90° C., and more specifically, from about 75° C. to about 84° C., whereby the solvent is removed by flashing thereof permitting the formation of the polyester in water as a stable emulsion, and thereafter mixing the polyester obtained with a colorant and accomplishing aggregation and coalescence thereof as illustrated herein and as disclosed, for example, in U.S. Pat. Nos. 5,290,654, 5,278,020, 5,308,734, 5,370,963, 5,344,738, 5,403,693, 5,418,108, 5,364,729, 5,346,797; 5,348,832; and 5,405,728, the disclosures of which are totally incorporated herein by reference.

Various known colorants, especially pigments, present in the toner in an effective amount of, for example, from about 1 to about 65, more specifically from about 2 to about 35 percent by weight of the toner, and yet more specifically in an amount of from about 1 to about 15 weight percent, include carbon black like REGAL 330®; and magnetites, such as Mobay magnetites MO8029™, MO8060™; and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, cyan 15:3, magenta Red 81:3, Yellow 17, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of specific cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative specific examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein and not dry pigments.

More specifically, colorant examples include Pigment Blue 15:3 having a Color Index Constitution Number of 74160, magenta pigment Red 81:3 having a Color Index Constitution Number of 45160:3, and Yellow 17 having a Color Index Constitution Number of 21105.

Colorants include pigments, dyes, mixtures of pigments, mixtures of dyes, and mixtures of dyes and pigments, and the like, and preferably pigments.

The toner may also include known charge additives in effective amounts of, for example, from 0.1 to 5 weight percent, such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surface additives that can be added to the toner compositions after washing or drying include, for example, metal salts, metal salts of fatty acids, colloidal silicas, metal oxides like titanium, tin and the like, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and flow aids, such as fumed silicas like AEROSIL R972® available from Degussa Chemicals, or silicas available from Cabot Corporation or Degussa Chemicals, each in amounts of from about 0.1 to about 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

The following Examples are provided. Parts and percentages are by weight unless otherwise indicated.

EXPERIMENTAL

Resin Synthesis Overview:

Two resins with low sulfonation were generated using a 2 liter Hoppes Polycondensation reactor containing about 3 percent (mol) and about 1.5 percent (mol) of dimethyl-5-sulfo isophthalate (DMSIP) where mol percent is calculated as (moles DMSIP charged/(total moles charged less excess moles glycol)×100 percent), in a formulation containing dimethylterephthalate (DMT), and a mixture of glycols, propylene glycol (PPG), dipropylene glycol (DPPG) and ethylene glycol (EG) in a ratio of 71.6/22.8/5.6. Butyltin oxide (FASCAT 4100™) was added as a catalyst.

The transesterification and polycondensation processes illustrated below were completed as a bulk polymerization reaction.

(i) Preparation of Polyester Resin with 3 Mol Percent Sulfonation:

Dimethylterephthalate (858 grams, 4.42 mol), sodium dimethyl 5-sulfoisophthalate "DMSIP" (86.2 grams, 0.29 mol), propylene glycol (514.6 grams, 6.76 mol), dipropylene glycol (290 grams, 2.15 mol), diethylene glycol (55.9 grams, 0.53 mol), and butyltin oxide (1.1 grams) were charged together into a 2 liter Hoppes reactor equipped with an anchor style agitator, and reflux and take-off condensers. The resulting mixture was heated to 180° C. over about a 1 hour period and agitated at 100 RPM. The temperature was increased gradually to 200° C. over 5 hours during which time the take-off condenser was used to remove methanol from the reaction, which methanol was collected in the distillate receiver. Once greater than 80 percent of the methanol had been removed, the transesterification was complete and the polycondensation was then initiated. Vacuum was applied to the reactor over a period of 60 minutes until about 3 to about 10 milliliters Hg vacuum was achieved. The reaction was continued for about 200 to about 500 minutes under vacuum during which time the temperature was maintained at about 190° C. to about 230° C. The endpoint of the polycondensation was determined for this Example when there was achieved a polymer softening point of 140° C.±5° C. using a Mettler softening point apparatus (starting point 120° C. and temperature ramp of 1° C./minute). Once the endpoint was achieved, the polymer was discharged in bulk to a stainless steel pan for cooling at room temperature, about 22° C. to about 25° C. The 3 mol percent sulfonated poly-[1,2-propylene-di(ethylene)-di(propylene)-terephthalate-sodium sulfoisophthalate] polymer product, where mol percent is calculated as (0.29 mole DMSIP charged/14.16 total moles charged less 4.68 moles excess glycol)×100 percent, was then crushed and stored for later use.

(ii) Preparation of Polyester Resin with 1.5 Mol Percent Sulfonation:

Dimethylterephthalate (1,063.9 grams, 5.48 mol), sodium dimethyl 5-sulfoisophthalate (51.7 grams, 0.17 mol), propylene glycol (617.5 grams, 8.11 mol), dipropylene glycol (348 grams, 2.59 mol), diethylene glycol (67.1 grams, 0.63 mol), and butyltin oxide (1.1 grams) were charged together into a 2 liter Hoppes reactor equipped with an anchor style agitator, and reflux and take-off condensers. The mixture was heated to 180° C. over about 1 hour and agitated at 100 RPM. The temperature was increased gradually to 200° C. over 5 hours during which time the take-off condenser was used to remove methanol from the reaction, which was collected in the distillate receiver. Once between 80 percent and 95 percent of the methanol had been removed, the transesterification step was complete and the polycondensation was then initiated. Vacuum was applied to the reactor over a period of 60 minutes, and until about 3 to about 10 milliliters Hg vacuum was achieved. The reaction was continued for about 200 to about 500 minutes under vacuum during which time the temperature was maintained at from about 190° C. to about 230° C. The endpoint of the polycondensation step was achieved when a softening point of 140° C.±5° C. using a Mettler softening point apparatus (starting point 120° C. and temperature ramp of 1° C./minute) resulted. Once the endpoint was achieved, the polymer was discharged in bulk to a stainless steel pan for cooling at room temperature, about 22° C. to about 25° C. The 1.5 mol percent sulfonated poly-[1,2-propylene-di(ethylene)-di(propylene)-terephthalate-sodium sulfoisophthalate] polymer product, where mol percent was calculated as (0.17 moles DMSIP charged/16.99 total moles charged less 5.68 moles excess glycol)×100 percent, was then crushed and stored for later use.

Solvent Flashing Emulsification:

Sulfonated polyester resins, such as sulfonated poly-[1,2-propylene-di(ethylene)-di(propylene)-terephthalate-sodiumsulfoisophthalate] with more than 3.5 percent and less than 10 percent sulfonation were dissipated in water at elevated temperatures (about 80° C. to about 90° C.) in the absence of a surfactant. The resin was crushed and added to hot water with turbulent mixing. At these sulfonation levels of greater than 3.5 percent, the resin was not readily dissipatable even with surfactant or specialized equipment such as a homogenizer. Further attempts to dissipate these sulfonated polyester resins in DIW at 90° C. with 2.5 pph NEOGEN RK™ surfactant and an Ultra-Turrax homogenizer operating at 8,000 rpm were not readily achievable. Only 44 percent of the 3.5 percent sulfonated resin and 10 percent of the 1.5 percent sulfonated resin could have been emulsified even with surfactant/homogenization. The portion of the resin that could have been emulsified had particle size diameters of 0.35 µm for the 3.5 percent sulfonated resin, and 2.12 µm for the 1.5 percent sulfonated resin. These very large particles were not that suitable for EA toner manufacturing since small (less than 0.200 µm) primary particles (emulsions) were usually selected to provide uniformly sized toner particle characteristics. In contrast, the solvent flashing technique could emulsify resins with no sulfonation (0 percent). The resins were completely, about 100 percent, emulsified with small particles (less than 0.200 µm). The diameter of the 3 percent poly-[1,2-propylene-di(ethylene)-di(propylene)-terephthalate-sodium sulfo isophthalate] sulfonated resin particles was 0.031 µm, the 1.5 percent resin was 0.152 µm and the 0 percent resin was 0.186 µm.

Preparation of 1.5 Mol Percent Sulfonated Emulsion:

420 Grams of 1.5 mol percent sulfonated resin (AT-SPE-20) were dissolved in 2,800 grams of acetone at room temperature to create a 15 weight percent solution. The resin was fully dissolved after 30 minutes of agitation (addition was slow to prevent clumping). In a 4 liter glass reaction kettle, 3,080 grams of deionized water were heated to 80° C., and the mixture resulting was agitated at approximately 600 rpm. The kettle was fitted with a pressure equalizing dropping funnel for solution addition, and a condenser and flask for solvent collection. The polymer solution was added to the hot water at a rate of 80 grams/minute, however, the addition was paused periodically to avoid overfilling the kettle (the rate of addition exceeded the rate of solvent distillation). The solvent (acetone, b.p. 56° C.) was removed by distillation and collected, enabling the recycling of the solvent for future emulsifications.

Once all of the polymer solution had been added, the emulsion was agitated at 80° C. for an additional hour, after which heating was terminated. The emulsion continued to agitate overnight with a slight nitrogen purge (1-2 SCFH). The final solids content of the poly-[1,2-propylene-di(ethylene)-di(propylene)-terephthalate-sodiumsulfoisophthalate] emulsion was measured at 18.9 percent solids (higher due to evaporation), and the average particle size diameter was 152 nanometers.

Preparation of 3 Mol Percent Sulfonated Emulsion:

336 Grams of 1.5 mol percent sulfonated resin (AT-SPE-20) were dissolved in 2,240 grams of acetone at room temperature to create a 13 percent by weight solids solution. The sulfonated resin was fully dissolved, 100 percent, after 30 minutes of agitation (addition was slow to prevent clumping). In a 4 liter glass reaction kettle, 3,080 grams of deionized water were heated to 80° C. and were agitated at approximately 600 rpm. The kettle was fitted with a pressure equalizing dropping funnel for solution addition, and a condenser and flask for solvent collection. The polymer solution was added to the hot water at a rate of 80 grams/minute; however, the addition was paused periodically to avoid overfilling the kettle (the rate of addition exceeded the rate of solvent distillation). The solvent (acetone, b.p. 56° C.) was removed by distillation and collected enabling the recycling of the solvent for future emulsifications.

Once all of the polymer solution was added, the emulsion was agitated at 80° C. for an additional hour, after which heating was terminated and the emulsion allowed to agitate overnight with a slight nitrogen purge (1-2 SCFH). The final solids content of the poly-[1,2-propylene-di(ethylene)-di(propylene)-terephthalate-sodiumsulfoisophthalate] emulsion was measured at 13.7 percent solids (higher due to evaporation), and the average particle size was 30.6 nanometers.

Toner Particle Growth Procedure:

(i) Preparation of Toner from 1.5 Mol Percent Sulfonated Emulsion:

The particle growth of toner particles from the above prepared 1.5 percent sulfonated resin was demonstrated at both a 0.5 liter and 2 liters reactor scale using standard Buchi stainless steel reactors. For the 0.5 liter reactor, a single pitched-blade impeller with 3 blades (P3, 45° pitch) was used at 800 rpm while for the 2 liter reactor, two P4/45° impellers spaced one impeller diameter apart were used along with 2 baffles. The agitation rate in the 2 liter Buchi was from about 500 to about 350 RPM.

In the 2 liter Buchi (MM-EAP-C17) was first added 1,289 grams of 1.5 mol percent emulsion (1,045.4 grams of deionized water, 243.6 grams of 1.5 mol percent sulfonated poly-[1,2-propylene-di(ethylene)-di(propylene)-terephthalate-sodium sulfoisophthalate]—average particle size of 152 nanometers, 18.9 percent solids content). 24.22 Grams of cyan (Blue 15:3) pigment dispersion were then added (47.4 percent solids, FLEXIVERSE BFD™ 1121 obtained from Sun Chemical) to provide a 4.5 percent pigment loading in the final toner. Agitation was set to 500 rpm and heating of the reactor to 58° C. was initiated. A 3 percent solution of zinc acetate ($Zn(OAc)_2$) coagulant was prepared in deionized water. Once the reactor temperature of 58° C. was reached, the addition of the coagulant solution was initiated at 0.6 gram/minute. No growth was observed after 90 minutes. The agitation rate was then decreased to 350 rpm. After 135 minutes, the coagulant addition rate was increased to 1.5 gram/minute. Particle growth became noticeable after 285 minutes of aggregation and the toner particles grew from 0.152 µm to 5.64 with a GSD of 1.26 (measured by Coulter Counter®) after 370 minutes. The coagulant solution feeding was terminated after 370 minutes. A total of 440.1 grams of the solution was added. The $Zn(OAc)_2$/resin ratio was 5.4 percent. For comparison, for 6 micron particle growth of the SPE resin with about 3.5 to about 4 percent sulfonation, 10 percent $Zn(OAc)_2$/resin was typically used. The reactor was set to full cooling and the toner slurry was discharged once the reactor temperature was less than 35° C.

The slurry resulting was discharged through 150 µm and 25 µm sieves to remove coarse particles. Mother liquor was then removed and the toner was washed twice with 1.4 liters of deionized water. Conductivity of the filtrate after the second wash was 12 µS/cm. The toner yield was 40 percent of theoretical. The fraction of coarse/fouled particles was 18.7 percent (fouled=11.4 percent, coarse=7.3 percent) of theoretical with the remainder of the particles being lost as fines. The particles were reslurried with deionized water (solids/water=30/70) and placed on a freeze dryer for 72 hours. Final moisture content in the toner was 0.92 percent. The dried particles were submitted for tribocharging analysis and for a moisture pick-up test. The moisture pick-up test involved placing the toner in a controlled environment (25° C., relative humidity (RH)=40, 60 and 80 percent). The equilibrium moisture content was determined at a given RH by removing samples at various times until the moisture content leveled off. The equilibrium moisture content was typically taken as the moisture content after 18 hours of exposure. For MM-EAP-C17, the equilibrium moisture content was found to be 1.11 percent at 60 percent RH and 1.45 percent at 80 percent RH.

This activity was designated MM-EAP-C18, and was accomplished in the 0.5 liter Buchi. Given the information from the 2 liter experiment above, the required amount and addition rate of the coagulant to provide significant growth could be determined. 322.25 Grams of 1.5 mol percent emulsion (261.3 grams of deionized water, 60.9 grams of 1.5 mol percent sulfonated poly-[1,2-propylene-di(ethylene)-di(propylene)-terephthalate-sodium sulfoisophthalate] resin, average particle size of 152 nanometers, 18.9 percent solids content) were added to the reactor with agitation set to 800 rpm. Heating to 58° C. was initiated. 9.24 Grams of cyan (Blue 15:3) pigment dispersion were then added (47.4 percent solids, BFD 1121 FLEXIVERSE™ pigment dispersion obtained from Sun Chemical) along with 34.58 grams of a Carnauba wax dispersion (20 percent solids, RC-160 wax (To a Kasei) stabilized with 2.5 pph NEOGEN RK™ surfactant). A 3 percent solution of Zn(OAc)2 coagulant was prepared and addition started at 0.4 gram/minute after the reactor temperature reached 58° C. The coagulant addition was stopped after 4 hours of aggregation. A total of 100 grams of the coagulant solution was added. Particle growth was relatively rapid, and toner particles grew from 0.152 µm to 5 µm in diameter after 5 hours of aggregation. After 8 hours, cooling was started. The average particle size resulting was 5.29 µm and the GSD was equal to about 1.27. Once the reactor temperature was less than 35° C., the slurry was discharged through 150 µm and 25 µm sieves to remove the coarse particles. The mother liquor was then removed and the toner was washed three times with 0.5 liter portions of deionized water. The conductivity of the filtrate after the final wash was less than 20 µS/cm (about 17 to 18). The toner yield was 51.8 percent of theoretical. The fraction of coarse/fouled particles was 19.5 percent (fouled=13.7 percent, coarse=5.8 percent) of theoretical.

The particle growth profiles for the two experiments displayed the typical sigmoidal shape associated with EA (emulsion aggregation) polyester toner particle growth when the coagulant was added slowly at a fixed rate. The particle size distributions had a slightly higher GSD than was typically observed for the EA polyester process but were still monomodal. A moisture pick-up test was conducted in which several toners were placed in environments of controlled humidity for several days. The moisture pick-up of MM-EAP-C17 toner was compared with an EA polyester with 4 percent sulfonation, EA1 toner and a conventional polyester toner with no sulfonation (F3C). After conditioning at 80 percent relative humidity, the EA polyester generated from a polyester resin with 1.5 percent sulfonation showed an equilibrium moisture content of 1.5 percent which was 160 percent less moisture sensitive compared to the EA polyester generated with a polyester resin with 4 percent sulfonation which showed an equilibrium moisture content of 3.75 percent. EA1 toner and conventional toner, both without any sulfonation, showed equilibrium moisture contents of between 0.50 percent and 0.75 percent. Thus, reducing the sulfonation level decreases the toner RH sensitivity.

Tribocharging of the toner with lower, 1.5 to 3, sulfonation confirmed a reduction in RH sensitivity. A-zone measurements for MM-EAP-C17 with a carrier were −5.3 µC/mm, C-zone measured at 21.9 µC/mm giving an RH ratio of 0.24 which, compared to a toner containing a polyester resin having 4 percent sulfonation, was an increase of a factor of 2 to 3 times. The A-zone charge itself was 4 to 5 times higher with the lower sulfonation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for the preparation of toner which comprises the heating of a sulfonated polyester and a colorant, and wherein said polyester possesses a sulfonation percentage of from about 0.5 to about 3 mol percent, and wherein said heating is accomplished by heating in sequence said polyester and colorant at a first temperature about below the glass transition temperature of said polyester, followed by second subsequent second heating at about above the glass transition of said polyester, and wherein aggregation/coalescence of said polyester and said colorant results, and which process is accomplished by solvent flashing.

2. A process in accordance with claim 1 wherein the colorant is a pigment.

3. A process in a accordance with claim 1 wherein the colorant is a dye.

4. A process in accordance with claim 1 wherein said mol percent is from about 1.5 to about 3.

5. A process in accordance with claim 1 wherein said mol percent is from about 1 to about 2.8.

6. A process in accordance with claim 1 wherein said mol percent is less than about 3.

7. A process in accordance with claim 1 wherein said mol percent is from about 1 to about 2.

8. A process in accordance with claim 1 wherein said first heating is at a temperature of from about 50° C. to about 70° C., and which heating enables aggregation of said polyester and said colorant.

9. A process in accordance with claim 1 wherein said first heating is at a temperature of from about 45° C. to about 55° C., and which heating enables aggregation of said polyester and said colorant.

10. A process in accordance with claim 1 wherein there is further included a wax component.

11. A process in accordance with claim 10 wherein said wax is a polypropylene.

12. A process in accordance with claim 10 wherein said wax is polyethylene.

13. A process in accordance with claim 10 wherein said wax is comprised of a mixture of polyethylene and polypropylene.

14. A process in accordance with claim 10 wherein said wax possesses a molecular weight average $M_w$ of from about 1,500 to about 20,000.

15. A process in accordance with claim 10 wherein said wax possesses a low molecular weight average $M_w$ of from about 3,500 to about 10,000, or a low molecular weight average $M_w$ of from about 4,000 to about 7,000.

16. A process in accordance with claim 1 wherein an emulsion is prepared by dissolving said sulfonated polyester in a suitable solvent, adding thereto hot water to exit the solvent thereby resulting in a mixture of said polyester in water.

17. A process in accordance with claim 16 wherein said solvent is an organic solvent.

18. A process in accordance with claim 16 wherein said solvent is acetone.

19. A process in accordance with claim 16 wherein said solvent is methyl ethyl ketane, ethyl acetate, toluene, methyl isobutyl ketone, or tetrahydrofuran.

20. A process in accordance with claim 16 wherein said solvent is selected in an amount of from about 85 to about 95 weight percent, and said polyester is selected in an amount of from about 35 to about 5 weight percent and wherein the total thereof is about 100 percent.

21. A process in accordance with claim 16 wherein said hot is from about 70° C. to about 90° C., or wherein said hot is from about 75° C. to about 84° C.

22. A process in accordance with claim 1 wherein said polyester is poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate phthalate), copoly(1,2-propylene-diethylene sodio 5-sulfoisophthalate)-copoly-(1,2-propylene-diethylene-terephthalatephthalate), copoly(ethylene-neopentylene-sodio 5-sulfoisophthalate)-copoly-(ethylene-neopentylene-terephthalate-phthalate), or copoly(propoxylated bisphenol A)-co-poly-(propoxylated bisphenol A-sodio 5-sulfoisophthalate.

23. A process in accordance with claim 1 wherein said polyester is copoly(1,2-propylene-diethylene sodio 5-sulfoisophthalate)-copoly-(1,2-propylene-diethylene-terephthalatephthalate), or copoly(1,2-propylene-diethylene) terephthalate-copoly(sodium sulfoisophthalate dicarboxylate).

24. A process in accordance with claim 1 wherein
(i) said sulfonated polyester is dispersed in water, which water is at a temperature of from about 50° C. to about 95° C.;
(ii) accomplishing an initial aggregation of the dispersed sulfonated polyester particles to submicron particles of from about 50 to about 200 nanometers in diameter by the addition of a solution containing a monocationic salt, a dicationic salt, or an electrolyte solution;

(iii) adding a colorant dispersion with from about 20 to about 50 weight percent of predispersed colorant in water with a colorant mean particle size of from about 50 to about 150 nanometers, and which dispersion is further diluted with deionized water, and controlling the aggregation rate by the dropwise addition of said salt, or said electrolyte, and then heating near the aggregation temperature of from about 40° C. to about 60° C. until toner sized aggregates are obtained as monitored by both optical microscopy and Coulter Counter particle size measurements, cooling; and (iv) recovering said toner composition, or said toner particles;

(v) drying said toner particles; and (vi) optionally adding to said dry toner particles of toner resin and colorant, wax, charge additives, and surface flow additives.

25. A process in accordance with claim 1 wherein the colorant is a cyan, black, a magenta, yellow dispersion or mixtures thereof.

26. A process in accordance with claim 1 wherein the sulfonated polyester is in the form of a dispersion comprised of from about 5 to about 30 weight percent solids, and the colorant dispersion contains from about 20 to about 50 weight percent of colorant, and wherein the toner particle size diameter is from about 3 to about 12 microns in volume average diameter.

27. A process in accordance with claim 1 wherein said toner is isolated, filtered, washed with water, and dried.

28. A process in accordance with claim 1 wherein there is added to the surface of the formed toner of sulfonated polyester and colorant, metal salts, metal salts of fatty acids, silicas, metal oxides, or mixtures thereof, each in an amount of from about 0.1 to about 7 weight percent of the obtained toner.

29. A toner process comprising heating and solvent flashing a sulfonated polyester, colorant, and optional wax, and wherein said polyester possesses a sulfonation percentage of from about 0.5 to about 3 mol percent, and wherein said heating is accomplished by heating in sequence said polyester and colorant at a first temperature about below the glass transition temperature of said polyester, followed by second subsequent second heating at about above the glass transition of said polyester, and wherein aggregation/coalescence of said polyester and said colorant results.

* * * * *